US005730786A

United States Patent [19]

Taub

[11] Patent Number: 5,730,786
[45] Date of Patent: Mar. 24, 1998

[54] MULTIPLE IN-DUCT FILTER SYSTEM

[75] Inventor: Steven I. Taub, Narberth, Pa.

[73] Assignee: Ceco Filters, Inc., Conshohocken, Pa.

[21] Appl. No.: 479,377

[22] Filed: Jun. 7, 1995

[51] Int. Cl.⁶ .................................................. B01D 19/00
[52] U.S. Cl. ...................... 96/189; 55/341.3; 55/341.5; 55/350.1; 55/466; 55/517; 55/527; 55/528
[58] Field of Search .................. 55/319, 324, 341.3, 55/341.5, 350.1, 419, 422, 428, 466, 484, 517, 522, 523, 527, 528; 95/241, 286; 96/188, 189

[56] References Cited

U.S. PATENT DOCUMENTS

| | | | |
|---|---|---|---|
| 2,771,153 | 11/1956 | Hennig | 55/517 |
| 3,307,335 | 3/1967 | Shomaker | 55/484 |
| 3,347,026 | 10/1967 | Zankey | 55/484 |
| 3,540,190 | 11/1970 | Brink, Jr. | |
| 3,606,737 | 9/1971 | Lefevre | 55/484 |
| 4,247,315 | 1/1981 | Neumann | 55/350.1 |
| 4,334,900 | 6/1982 | Neumann | 55/350.1 |
| 4,385,913 | 5/1983 | Lane | 55/484 |
| 4,521,232 | 6/1985 | Howeth | 55/350.1 |
| 4,818,257 | 4/1989 | Kennedy et al. | 55/487 |
| 4,838,903 | 6/1989 | Thomaides et al. | 55/480 |
| 4,877,521 | 10/1989 | Petrucci et al. | 55/484 |
| 4,948,398 | 8/1990 | Thomaides et al. | 55/320 |
| 4,976,758 | 12/1990 | Yen | 55/484 |
| 5,277,704 | 1/1994 | Miller et al. | 55/321 |

FOREIGN PATENT DOCUMENTS

| | | | |
|---|---|---|---|
| 564265 | 4/1928 | Germany | 55/484 |
| 718134 | 2/1980 | U.S.S.R. | 55/484 |
| 837360 | 7/1981 | U.S.S.R. | 55/484 |

*Primary Examiner*—C. Scott Bushey
*Attorney, Agent, or Firm*—Seidel, Gonda, Lavorgna & Monaco, PC

[57] ABSTRACT

A fiber bed mist eliminator system is disclosed that includes a collector vessel having at least one inlet and at least two outlets. The system further includes at least two filter housings removably secured to the collector vessel, in which each filter housing has an inlet and outlet. Each filter housing includes a fiber bed mist eliminator. A valve may optionally be provided between at least one filter housing and the collector vessel. Each fiber bed includes an inner surface defining a first closed space and an outer surface defining a second space. The first closed space is optionally in communication with the collector vessel outlet or the filter housing outlet.

15 Claims, 5 Drawing Sheets

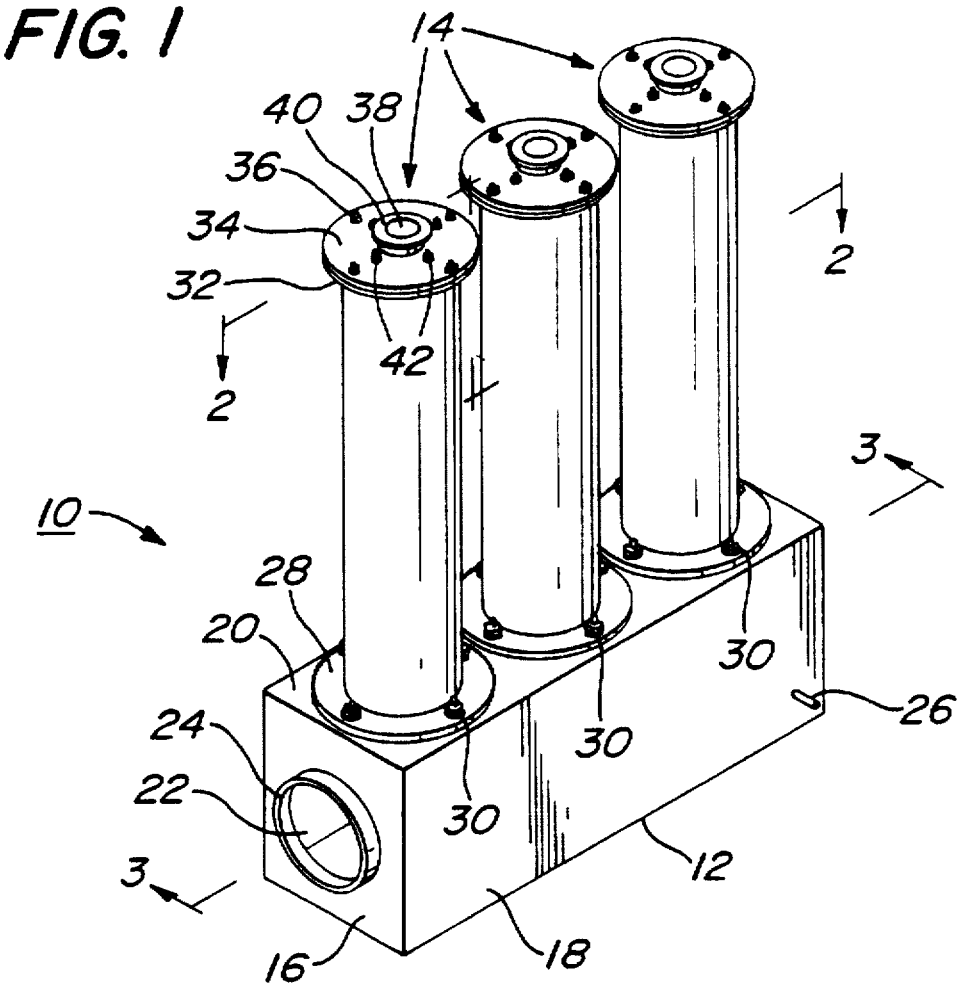
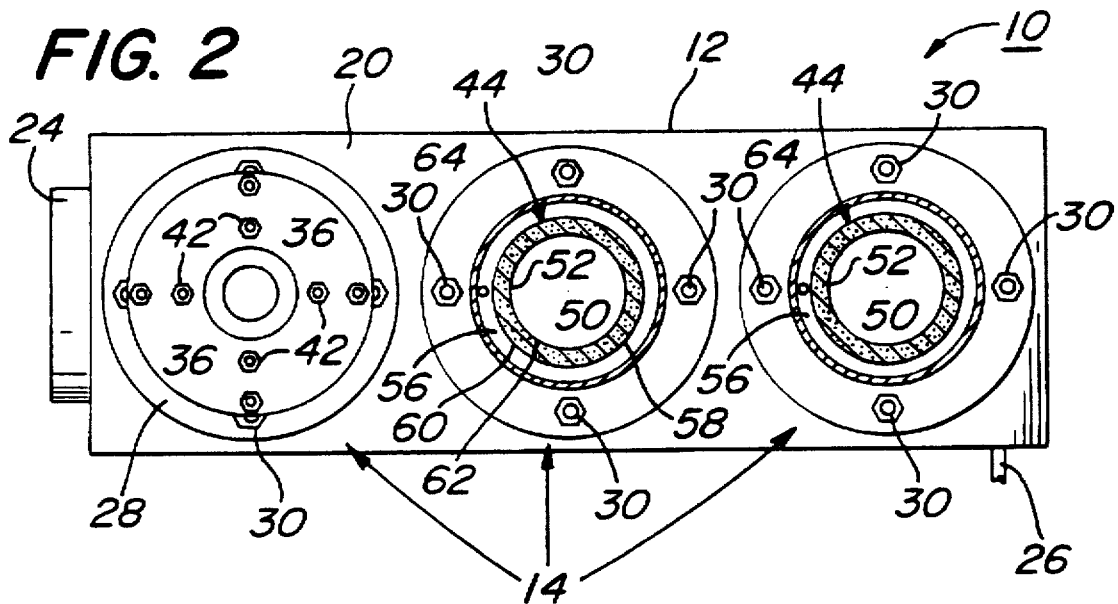

MULTIPLE IN-DUCT FILTER SYSTEM

FIELD OF THE INVENTION

This invention relates to an improved fiber bed separator system and process for the separation of aerosols from gas streams. More particularly, it relates to a fiber bed mist eliminator wherein a plurality of individually housed fiber bed mist eliminators are provided in the vicinity of an aerosol generating source.

BACKGROUND OF THE INVENTION

Fiber bed mist eliminators are commonly used to remove fine particles from a gas stream passing therethrough. The particles may be either solid or liquid. The term aerosol refers to a suspended particle, either solid or liquid, which is slow to settle by gravity and having a diameter ranging from sub-micrometer up to 10 microns, more commonly up to 3 microns.

A solid-liquid dispersion, such as an aerosol, may intentionally or unintentionally develop in a two phase (liquid-gas) environment. For instance, gases and liquids may be contacted in absorption or distillation operations resulting in a solid-liquid dispersion. It is usually desirable for environmental or economic reasons to separate the solid-liquid dispersion into separate gas and liquid components. Many devices have been developed to facilitate this separation process. One such device is the fiber bed mist eliminator.

Many industrial facilities have a multitude of process systems which generate waste gas streams containing aerosols. Typically, conduits are provided throughout these facilities to carry the particle-laden air to a filtering system for treatment. These conduits may represent a safety hazard as a result of the aerosols being carried in the waste stream. The aerosols, as they travel through the conduits, also tend to contaminate the conduits by impacting the sides of the conduits. These contaminated conduits usually must be treated to remove the contaminants prior to opening, removing, or replacing such conduit sections.

Many industrial facilities include conduits from each aerosol generating process system. The gas streams containing aerosols from each of these systems are usually directed into an aerosol filtering system. The aerosol filtering system is likely to consist of a large vessel containing a plurality of fiber bed mist eliminators. The fiber bed mist eliminators within the vessel may be either single wall filters, multiple parallel filters, as described in U.S. Pat. No. 4,948,398, which is incorporated herein by reference, or multi-phase filters, as described in U.S. Pat. No. 4,838,903, which is also incorporated herein by reference. The aerosols are removed from the gas stream as the gas stream passes through a packed bed portion of the filters, thereby causing the aerosols to coalesce into large droplets. The droplets are then drawn downward by gravity into a drain.

Typical filtering systems employing fiber bed mist eliminators in a large common vessel suffer from some drawbacks, which are overcome by the present invention. As an example, in order to increase the effective surface area of a fiber bed filtering system, the height and/or diameter of the fiber bed may be increased. Height and weight limitations of the particular industrial facility may preclude increasing the height of a fiber bed beyond 30 feet or having a fiber bed with a diameter greater than 40 inches. Additionally, as each fiber bed is enlarged, the weight of the overall vessel is increased, which thereby dictates larger support structures.

Housing a plurality of fiber bed mist eliminators in a common vessel has certain other disadvantages. A common treatment vessel filtering system frequently requires personnel to make confined spaces entries into the vessel in order to complete maintenance on individual filter elements. Confined space entries into the vessel introduce a degree of hazard as a result of the potential for exposure to fumes or other injury. Furthermore, since all of the gas streams containing aerosols in an industrial facility employing a common treatment system are sent to one treatment vessel, any maintenance or repairs on the filtering system necessarily requires shutting down all process systems that generate aerosols within the particular industrial facility during the period of filter maintenance of the common vessel, because it is not possible to remove a single filter element for maintenance or replacement without shutting off all flow into the vessel.

There is a need for an aerosol filtering system capable of providing higher throughput to remove fine particles. However, the system must provide an increased filtering surface area within the height and weight limitations of standard industrial facilities.

Additionally, an aerosol filtering system is needed that reduces the distance that particle-laden air must travel to a treatment system and thereby reduce the length of contaminated conduit.

Additionally, a filtering system is needed wherein individual filters can be individually monitored, removed, repaired, and/or replaced.

SUMMARY OF THE INVENTION

An improved aerosol filtering system and process for removing aerosols is provided. In one embodiment, the invention is directed to a fiber bed mist eliminator useful for the removal of aerosols of less than 3 microns from a moving gas stream. The fiber bed mist eliminator system includes a collector vessel having an inlet for allowing an aerosol laden gas stream to enter the collector vessel. The collector vessel further includes at least two outlets for allowing the aerosol laden gas stream to exit from the collector vessel. The system further includes at least two filter housings. The filter housings are characterized by being removably secured to the collector vessel and having an inlet and outlet.

A fiber bed mist eliminator is provided within each filter housing. Each fiber bed mist eliminator has an inner surface and an outer surface. The inner surface defines a first closed space within the fiber bed mist eliminator for the passage of a gas stream. The first closed space is open to the collector vessel outlet. A second space defined by the outer surface and the filter housing is open to the filter housing outlet. Optionally, the first closed space is open to the filter housing outlet, while the second space is open to the collector vessel outlet.

The present invention further provides a process for the substantial removal of aerosols entrained in a moving gas stream. The aerosols are removed by employing a filtering system that includes a collector vessel and at least two filter housings removably secured to the collector vessel. Each filter housing contains a fiber bed mist eliminator. Each fiber bed includes an inner surface, an open end, and a closed end defining a first closed space open to one of the outlets from the collector vessel for the passage of the gas stream. An outer surface of the fiber bed and the filter housing form a second space open to the filter housing outlet. In the alternative, the first closed space may be open to the filter housing outlet, while the second space is open to one of the outlets from the collector vessel.

The process for substantially removing aerosols begins by introducing an aerosol containing gas stream into the collector vessel through said collector vessel inlet. The aerosol containing gas stream is then divided into at least two gas segments. Each gas segment is passed through the filter housing without contacting any other gas segment to form a substantially aerosol-free gas stream. The substantially aerosol-free gas stream is removed from said vessel through the filter housing outlet.

For the purpose of illustrating the invention, the drawings illustrate presently preferred embodiments. It is understood, however, that the present invention is not limited to the precise arrangements and instrumentalities shown therein. A brief description of the drawings is as follows.

DESCRIPTION OF THE DRAWINGS

FIG. 1 is a perspective drawing of a multiple in-duct filter system.

FIG. 2 is a top view of the multiple in-duct filter system shown in FIG. 1.

DESCRIPTION OF THE INVENTION

Figure 3:
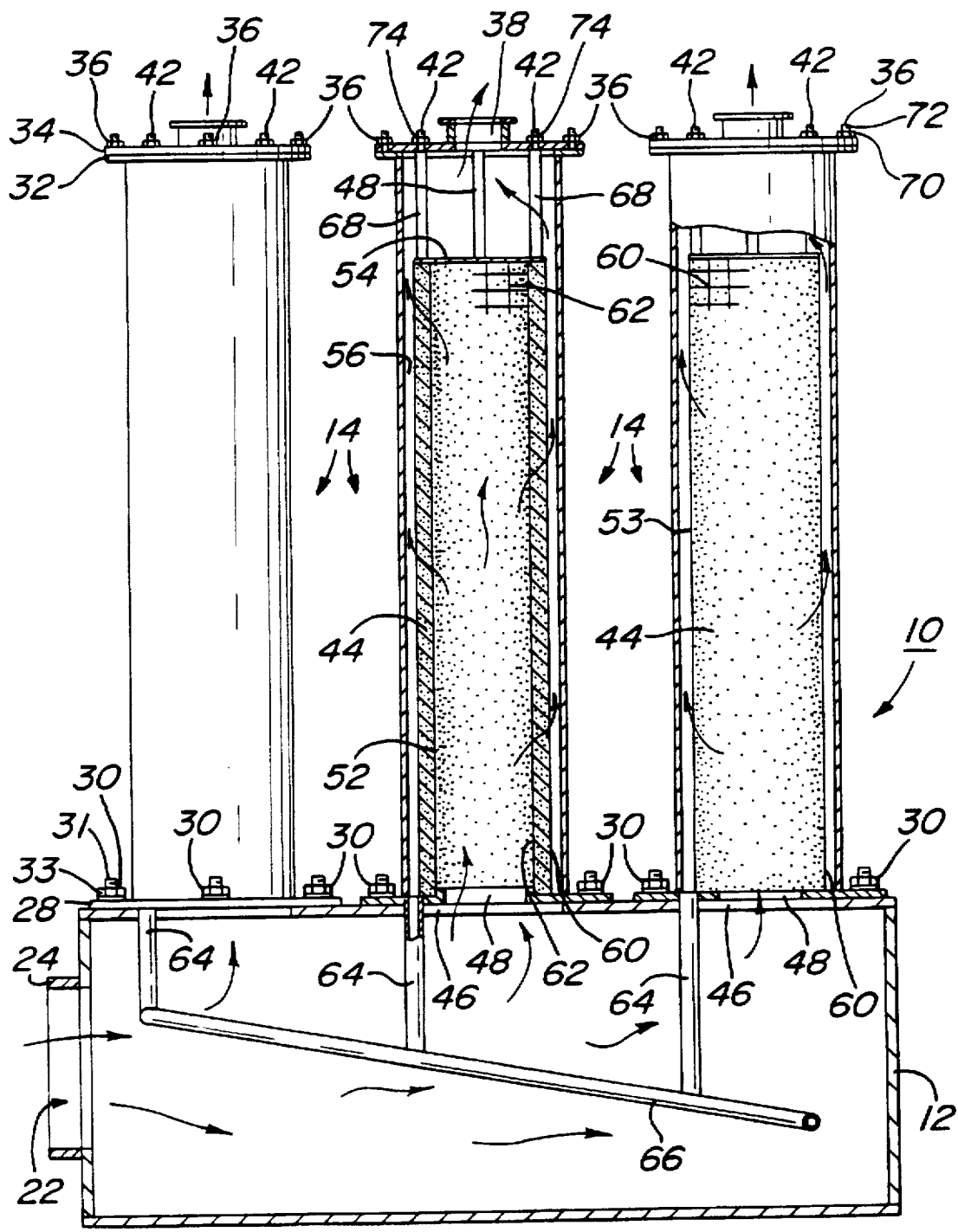
FIG. 3 is a side view showing partial sections of the multiple in-duct filter system of FIG. 1.

In many industrial situations, it is desirable to provide a filtering system capable of removing airborne particles. These particles may be either solid or liquid. Aerosols of this nature typically have a particle size of less than 10 microns, more commonly less than 3 microns. Fiber bed filtering systems are commonly used to remove aerosols from gas streams due to their high efficiency. Typically, a plurality of fiber bed filters are employed for this purpose within a common treatment vessel. A multitude of process gas streams containing aerosols are usually introduced into the common treatment vessel.

The present invention provides a filtering system having a plurality of fiber bed mist eliminators contained in individual housing elements. Additionally, the present filtering system is most advantageously positioned in the immediate vicinity of an aerosol generating source. A multitude of filtering systems may be provided throughout a facility in this manner. Accordingly, by providing filtering systems in the immediate vicinity of each aerosol generating source throughout a facility, the effective surface area of the overall filtering system is substantially increased. Additionally, the surface area of the overall filtering system within the particular industrial facility is increased without increasing the height or diameter of the fiber beds within each filter housing.

A further advantage of the present invention is that each individually housed fiber bed may be monitored, removed, or replaced without shutting down the entire filtering system. Additionally, the positioning of the filtering systems in the vicinity of an aerosol generating source allows an operator to identify the source of a process which may be producing particles that are clogging an aerosol filtering system. The localized positioning of the filtering system also reduces the amount of conduit carrying aerosol laden air.

Referring to FIG. 1, a multiple in-duct filtering system 10 is shown therein. Filter system 10 comprises a collector vessel 12 and a plurality of filter housings 14. Three upstanding filter housings 14 are shown in FIG. 1 for purposes of illustration only. Only two filter housings 14 may be provided in similar fashion. More than three may also be provided. It is also noted that filter housings 14 are shown in an upstanding linear configuration. Those skilled in the art will recognize that collector vessel 12 may be modified such that filter housings 14 form an upstanding L-shape or, if additional filter housings 14 are added, a plurality of upstanding rows. The configuration of the filter housings 14 is not essential to the present invention.

Collector vessel 12 is a hollow chamber defined by a pair of upstanding end walls 16, side walls 18, top wall 20, and a bottom wall (not shown). End wall 16 is characterized by having an inlet 22 surrounded by a lip portion 24. A drain outlet 26 extends from side wall 18. Drain outlet 26 will be discussed in greater detail below. Top wall 20 functions analogously to a tube sheet found in common treatment vessels.

Two or more filter housings 14 are removably secured to top wall 20 of collector vessel 12. Each filter housing 14 is generally constructed of a material that is impervious to fluids and inert to the aerosols contained in the system. Examples of suitable materials are metals, plastics, or combinations thereof. Each filter housing 14 is characterized by having a bottom flange section 28 adapted to engage a plurality of lower lifting bolt assemblies 30 in known fashion. The lower lifting bolt assemblies 30 preferably pass through mating holes in top wall 20 from the interior of collector vessel 12 and through holes provided in bottom flange section 28. Lower lifting bolt assemblies 30 may consist of, for example, a combination of a threaded nut 31 and internally threaded bolt 33, as best seen in FIG. 3. Threaded nut 31 may be freely removable from or affixed by welding or other well known mechanisms to collector vessel 12. The manner in which each filter housing 14 is secured via bottom flange section 28 to collector vessel 12 is well known in the art and will not be further described herein. A gasket, not shown, may be provided between each bottom flange section 28 of filter housing 14 and top wall 20.

Each filter housing 14 is further characterized by having an upper flange section 32. A plate 34 is removably secured to each upper flange section 32 via upper lifting bolt assemblies 36. Each plate 34 is secured via upper lifting bolt assemblies 36 to upper flange section 32 in a manner analogous to the connection between filter housing 14 and collector vessel 12. Each upper lifting bolt assembly 36 may consist of, for example, a combination of a threaded nut 72 and internally threaded bolt 70. This method of connection is well known to those skilled in the art and will not be further described herein.

Each plate 34 is further characterized by having an opening 38 which is defined by second lip region 40. Opening 38 provides an outlet for the gas contained in each filter housing 14. Plate 34 is adapted to receive a plurality of locking bolt assemblies 42 spaced radially inward of upper lifting bolt assemblies 36. The function of locking bolt assemblies 42 will be described in greater detail below. Locking bolt assemblies 42 consist of a threaded rod 68 and bolt 74, also best seen in FIG. 3.

Referring now to FIGS. 2 and 3, a plurality of fiber bed mist eliminators 44 contained in individual filter housings 14 are illustrated. Process gas enters collector vessel 12 from inlet 22 provided on end wall 16, and is divided into a plurality of gas segments. Each gas segment travels upwardly through opening 46 of collector vessel 12, through opening 48 in bottom flange section 28, and into radially first closed space 50. The arrangements of fiber beds 44 shown in FIGS. 2 and 3 are generally referred to as an "inside/out" arrangements. The designation of "inside/out" is based upon the flow of gas through the fiber bed 44.

Although the fiber beds 44 are illustrated in FIGS. 2 and 3 as cylindrical, any desirable polygonal cross-section configuration can be employed. Each fiber bed 44 includes a first closed space 50, which is defined by inner wall 52 and end plate 54. A second space 56 surrounds each fiber bed 44 and is defined by outer wall 53 and filter housing 14. Each second space 56 is open to filter housing opening 38.

An end plate 54 is provided at the end of each fiber bed 44 in order to close off the upper end of first closed space 50. End plate 54 forces gas entering into first closed space 50 to pass through fiber bed 44 into second space 56. Aerosol-containing gas entering first closed space 50 which passes through fiber bed 44 is subsequently removed through filter housing opening 38. Those skilled in the art will recognize that the fiber beds 44 shown in FIGS. 2 and 3 are single wall fiber bed mist eliminators, as taught in U.S. Pat. No. 3,540,190, in the name of J. A. Brink, Jr. which is incorporated herein by reference. The present invention also contemplates that one or more of fiber beds 44 may optionally be fitted with improved fiber beds such as multiple parallel or multi-phase fiber bed mist eliminators, as described in U.S. Pat. Nos. 4,948,398 and 4,838,903 incorporated herein by reference, in lieu of a single wall fiber bed, as illustrated.

Referring to FIG. 3, each fiber bed 44 comprises randomly distributed fibers having a mean diameter in the range from about 2 to about 50 microns. It is presently preferred that these fibers be packed to a density ranging from about 6 to about 12 pounds per cubic foot. Suitable fiber material which can be employed when practicing the present invention include, but are not limited to, fibers of polymeric materials (e.g., polyesters, polyvinyl chloride, polyethylene, fluorocarbons, nylons, polypropylene), glass fibers, and, ceramic fibers and mixtures thereof.

Each fiber bed 44 preferably sandwiches the fibers between an outer cage 60 and an inner cage 62, shown as partial sections in FIG. 3. These cages can be made from any suitable material which supports the fibers of fiber bed 44 in a substantially stationary position. It is also presently preferred that the material from which cages 60 and 62 are made are inert relative to the airstream and aerosols contained therein during operation. Examples of suitable materials from which outer cage 60 and inner cage 62 can be prepared, include, but are not limited to, plastic, metal, and/or mixtures thereof.

For purposes of illustration, in filter system 10, each fiber bed 44 is stabilized by rods 68 extending from upper locking bolt assemblies 42 through plate 34. Other means within the scope of the present invention for stabilizing fiber beds 44 include affixing cross members to end plates 54, wherein said cross members extend across the width of filter housings 14. Still other means include the use of rods extending through top wall 20 of collector vessel 12 into fiber beds 44.

Figure 4:
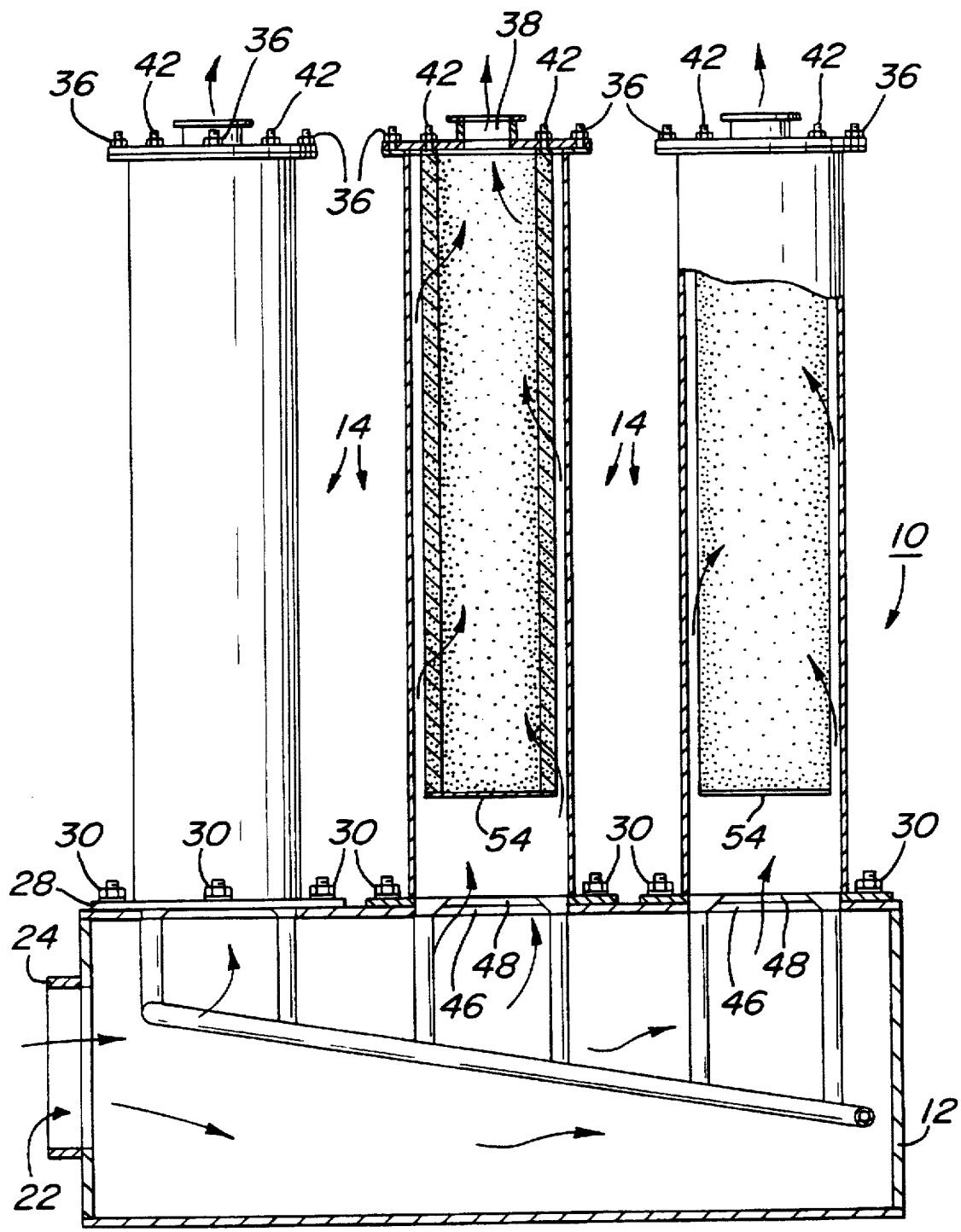
FIG. 4 is a side view showing partial sections of an alternative embodiment of the multiple in-duct filter system of FIG. 1.

It should be understood that it is also within the scope of this invention for the fiber beds 44 to be suspended from plate 34, as shown in FIG. 4. If fiber beds 44 are suspended from plate 34, an "outside/in" fiber bed filter arrangement is employed wherein end plate 54 is provided on the bottom of fiber bed mist eliminator 44. In a manner analogous to the "inside/out" arrangement described above, an "outside/in" arrangement refers to the gas flow path from the second space 56 of the fiber bed 44 to the annular space 50.

In the "outside/in" arrangement, each fiber bed 44 may be stabilized within each filter housing 14 by providing rods which extend into said fiber beds 44 in similar fashion to the "inside/out" arrangement. Furthermore, it should also be understood that again, for purposes of illustration, FIGS. 1-4 show only three upstanding filter housings 14 containing individual fiber beds 44. It is within the scope of this invention, however, to employ a greater or smaller number of fiber beds 44.

Referring to FIG. 3, in operation, an aerosol-containing gas stream is introduced into collector vessel 12 through inlet 22. The rate at which the gas stream flows into collector vessel 12 must not cause re-entrainment of aerosols collected by fiber bed 44. Generally, the flow rate of the gas stream being introduced into collector vessel 12 can range from about 1 to about 500,000 cubic feet, preferably from about 5 to about 250,000 cubic feet per minute, and more preferably, from about 10 to about 100,000 cubic feet per minute.

After being introduced through inlet 22, the aerosol-containing gas stream is divided into gas segments. Each gas segment travels upwardly through corresponding openings 46 and 48 in top wall 20 and lower flange sections 28, respectively, into first closed space 50. Since the upper end of space 50 is closed by end plate 54, the aerosol-containing gas stream segment is forced to flow through fiber beds 44 into second space 56 forming a substantially aerosol free gas stream segment. After entering second space 56, the substantially aerosol free gas stream segment flows out of filter housing 14 through openings 38. Aerosol droplets that are removed from the aerosol laden gas streams passing through fiber beds 44 coalesce and fall by gravity through drain 64. Each drain 64 feeds into a common conduit 66 which leads to drain outlet 26.

One of the advantages of the present invention is the ease of maintenance of each individual fiber bed mist eliminator 44. In order to repair or replace an individual fiber bed mist eliminator 44, the corresponding filter housing 14 is removed from collector vessel 12. Prior to removing filter housing 14, the gas stream being introduced into collector vessel 12 is preferably stopped. Filter housing 14 is then removed by unscrewing bolt 33 from nut 31 on lower lifting assemblies 30. The corresponding filter housing 14 is then lifted up and away from threaded nut 31. A new filter housing 14 or a cover plate (not shown) may be substituted thereon. The cover plate may be adapted to prevent the gas stream entering collector vessel 12 from passing through opening 46 in top wall 20.

In the alternative, fiber bed 44 may be removed directly from filter housing 14. Fiber bed 44 is removed in this manner by unscrewing nuts 72 and bolts 70 forming upper lifting bolt assemblies 36. Plate 34, with fiber bed 44 secured thereto by locking bolts 42, is then lifted out of filter housing 14. Again, a new fiber bed 44, with a plate secured thereto, or a cover plate as described above, may be placed into or onto filter housing 14.

Figure 5:
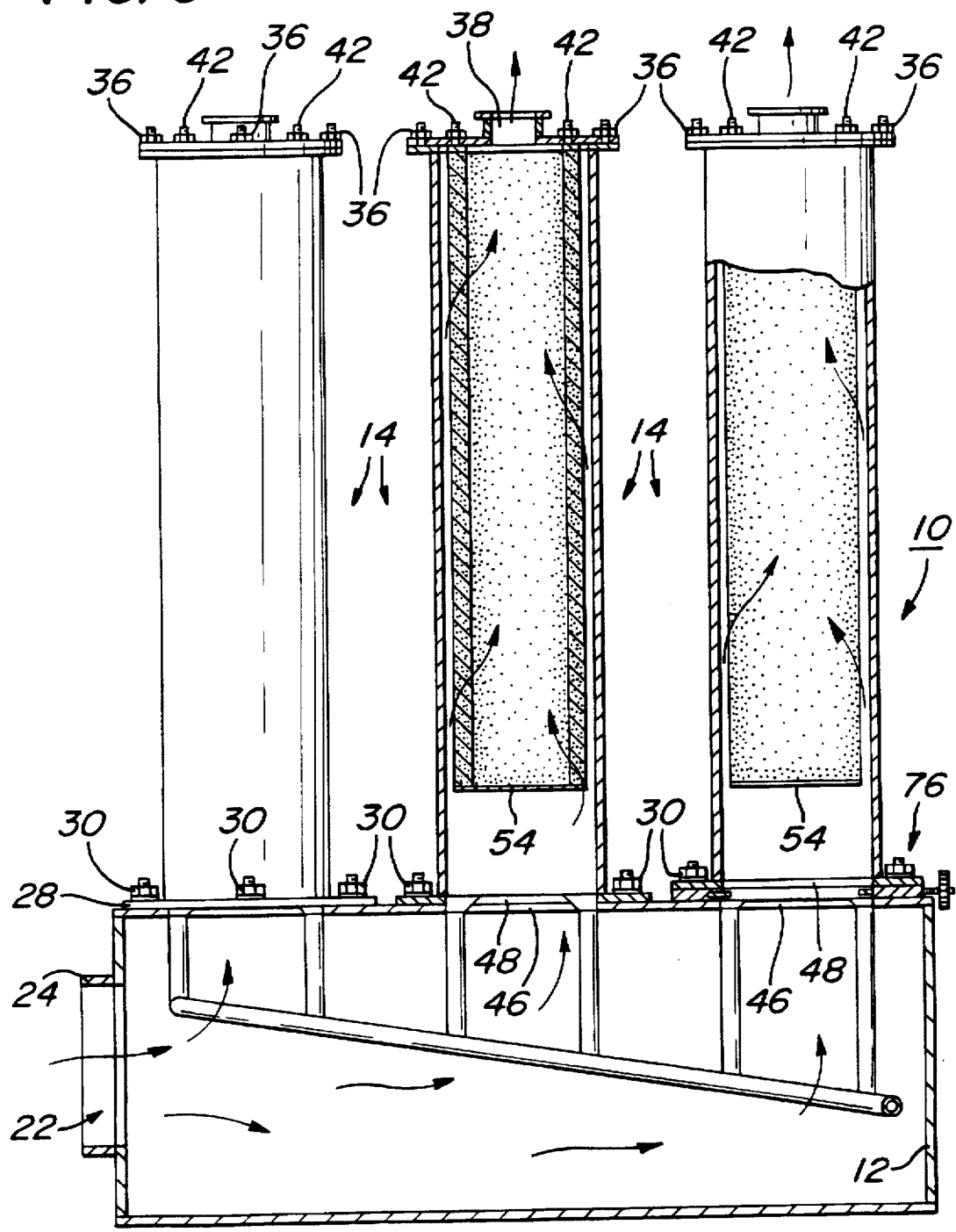
FIG. 5 is a side view showing partial sections of an alternative embodiment with a valve to selectably close parts of the multiple in-duct filter system of FIG. 1.

A further modification contemplated by the present invention is shown in FIG. 5 wherein a valve 76 is provided between at least one filter housing 14 and top wall 20 to selectably close opening 46. The advantage obtained by further providing valve 76 in filter system 10 is that each individual filtering housing 14 or fiber bed 44 may be removed or replaced without shutting down the filter assembly 10. Once valve 76 is closed, the respective filter housing 14 or fiber bed 44 may be removed in the manner described above.

Figure 6:
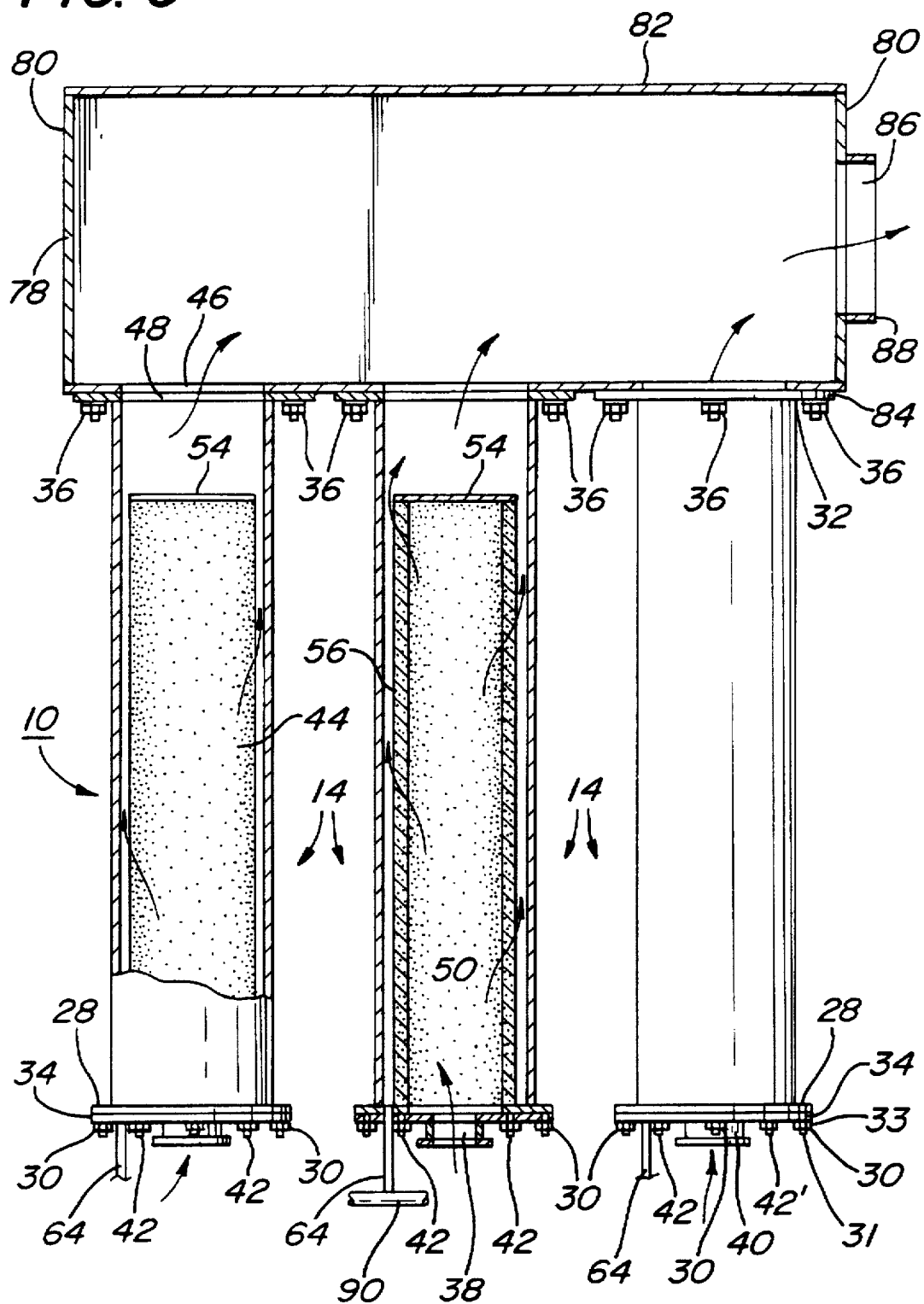
FIG. 6 is a side view showing partial sections of a second alternative embodiment of the multiple in-duct filter system of FIG. 1.

A still further embodiment of filter assembly 10 is shown in FIG. 6 wherein a plurality of filter housings 14 are shown suspended from a common manifold 78. Three filter housings 14 are shown in FIG. 6 for purposes of illustration only. Only two filter housings 14 may be provided in similar fashion. More than three may also be provided.

Common manifold 78 is a hollow chamber defined by a pair of upstanding end walls 80, side walls (not shown), top wall 82, and a bottom wall 84. At least one end wall 80 is characterized by having an outlet 86 surrounded by a lip portion 88. Bottom wall 84 functions analogously to a tube sheet found in common treatment vessels.

Two or more filter housings 14 are removably secured to bottom wall 84 of manifold 78. Each filter housing 14 is generally constructed of a material that is impervious to fluids and inert to the aerosols contained in the system passing therethrough. Examples of suitable materials are metals, plastics, or combinations thereof.

The filter housing 14 used in the embodiment shown in FIG. 6 is identical to the filter housing 14 described with reference to FIGS. 1–5. Each filter housing 14 is characterized by having a bottom flange section 28 adapted to engage a plurality of lower lifting bolt assemblies 30 in known fashion. A plate 34 is removably secured to each lower flange section 28 via lower lifting bolt assemblies 30. The lower lifting bolt assemblies 30 preferably pass through holes provided in bottom flange section 28 and plate 34. Lower lifting bolt assemblies 30 may consist of, for example, a combination of a threaded bolt 31 and internally threaded nut 33. The manner in which each plate 34 is secured via bottom flange section 28 to filter housing 14 is well known in the art and will not be further described herein.

Each plate 34 is characterized by having an opening 38 which is defined by second lip region 40. Opening 38 serves as an inlet for the gas for each filter housing 14. Plate 34 is adapted to receive a plurality of locking bolt assemblies 42 spaced radially inward of lower lifting bolt assemblies 30. The function of locking bolt assemblies 42 will be described in greater detail below. Locking bolt assemblies 42 may consist of a threaded rod and bolt.

Each filter housing 14 further includes an upper flange section 32. Each filter housing 14 is secured via upper lifting bolt assemblies 36 and upper flange section 32 to common manifold 78 in a manner analogous to the connection between plate 34 and lower flange section 28. Each upper lifting bolt assembly 36 may consist of, for example, a combination of a threaded nut and internally threaded bolt. This method of connection is well known to those skilled in the art and will not be further described herein.

Each filter housing 14 contains an individual fiber bed 44. Aerosol-laden process gas segments enter each filter housing 14 through opening 38 provided through plate 34. Each gas segment then travels upwardly through opening 38 into radially first closed space 50 of fiber bed 44. The arrangement of fiber beds shown in FIG. 6 is generally referred to as an "inside/out" arrangement, which has been described above. Each filter housing 14 further includes a drain 64 that leads to a sump 90. The liquid component removed from each aerosol-laden gas segment is discharged from filter housing 14 via drain 64.

Although the fiber beds 44 illustrated in FIG. 6 are cylindrical, any desirable polygonal cross-section configuration can be employed. Each fiber bed 44 includes a first closed space 50, which is defined by an inner wall of the fiber bed and end plate 54. A second space 56 surrounds each fiber bed 44 and is defined by an outer wall of fiber bed 44 and filter housing 14. Each second space 56 is open to openings 46 and 48, which lead to common manifold 78.

End plate 54 is provided at the end of each fiber bed 44 in order to close off the upper end of first closed space 50. End plate 54 forces each gas segment entering into first closed space 50 to pass through fiber bed 44 into second space 56. Aerosol-containing gas entering first closed space 50 which passes through fiber bed 44 is subsequently removed through openings 46 and 48 leading to common manifold 78. Those skilled in the art will recognize that the fiber beds 44 shown in FIG. 6 are single wall fiber bed mist eliminators. The present invention also contemplates that one or more of fiber beds 44 may optionally be fitted with improved fiber beds such as multiple parallel or multi-phase fiber bed mist eliminators, as described in U.S. Pat. Nos. 4,948,398 and 4,838,903 incorporated by reference, in lieu of a single wall fiber bed, as illustrated.

Each fiber bed 44 in the embodiment shown in FIG. 6 is constructed, secured, and used in an identical manner to the fiber beds 44 described above with reference to FIGS. 1–5. Hence, further disclosure of fiber bed 44 that may be used in the FIG. 6 embodiment will be made by reference to FIG. 3. As shown in FIG. 3, each fiber bed 44 comprises randomly distributed fibers having a mean diameter in the range from about 2 to about 50 microns. It is presently preferred that these fibers be packed to a density ranging from about 6 to about 12 pounds per cubic foot. Suitable fiber material which can be employed when practicing the present invention include, but are not limited to, fibers of polymeric materials (e.g., polyesters, polyvinyl chloride, polyethylene, fluorocarbons, nylons, polypropylene), glass fibers, and, ceramic fibers and mixtures thereof.

Each fiber bed 44 preferably sandwiches the fibers between an outer cage 60 and an inner cage 62, shown as partial sections in FIG. 3. These cages can be made from any suitable material which supports the fibers of fiber bed 44 in a substantially stationary position. It is also presently preferred that the material from which cages 60 and 62 are made are inert relative to the airstream and aerosols contained therein during operation. Examples of suitable materials from which outer cage 60 and inner cage 62 can be prepared, include, but are not limited to, plastic, metal, and/or mixtures thereof.

For purposes of illustration, fiber beds 44 are shown in FIG. 6 as affixed to plate 34 via locking assemblies 42. It should be understood that it is also within the scope of this invention for fiber beds 44 to be suspended from bottom wall 84, in a manner analogous to the configuration shown in FIG. 4. If fiber beds 44 are suspended from bottom wall 84, an "outside/in" fiber bed filter arrangement is employed wherein end plate 54 is provided on the bottom of fiber bed 44.

When practicing the present invention, the velocity at which the gas stream flows through the fiber bed 44 should be less than that which results in a substantial re-entrainment of collected aerosols. The flow rate of a gas stream through the fiber bed 44 is any rate less than about 200 feet per minute. While there is no lower limit, for practical purposes, the flow rate of the gas stream passing through the fiber bed 44 should be greater than about one foot per minute. Preferably, this flow rate ranges from about 10 to about 200 feet per minute, more preferably from about 20 to about 100 feet per minute.

The flow rate of a gas stream through the fiber bed elements can be controlled by manipulating many different parameters. For example, if all other factors are held constant, the flow rate of a gas stream through the fiber bed 44 can be decreased by increasing the volume of the first closed space 50 into which the aerosol containing gas stream enters. The flow rate of a gas stream through the fiber bed 44 can also be decreased by increasing the surface area of the fiber beds 44. The surface area of a fiber bed 44 can be increased by: 1) increasing the number of filter housings 14 with fiber beds 44 used in a specific filtering assembly 10; 2) increasing the size of the individual fiber beds 44; and/or 3) increasing the number of radially spaced fiber beds 44 per fiber housing 14 (applicable only to multiple parallel fiber bed mist eliminators).

It is evident from the foregoing that various modifications can be made to the embodiments of the present invention without departing from the spirit and/or scope thereof. Having thus described the invention, it is claimed as follows:

That which is claimed is:

1. A fiber bed mist eliminator system useful for the removal of aerosols of less than 3 microns from a moving gas stream, the fiber bed mist eliminator system comprising:
 a) a collector vessel having at least one inlet for allowing an aerosol laden gas stream to enter the collector vessel;
 b) at least two filter housings, each housing having a gas inlet in communication with the collector vessel and a gas outlet, wherein each filter housing is removably secured to the collector vessel;
 c) a fiber bed mist eliminator contained within each filter housing, each mist eliminator having an inner surface defining a first closed space in communication with the gas inlet and an outer surface defining with the filter housing a second space in communication with the gas outlet and
 d) at least one outlet in each housing for exit of liquids removed from the aerosol-laden air by the fiber bed mist eliminator in the housing.

2. A fiber bed mist eliminator system useful for the removal of aerosols of less than 3 microns from a moving gas stream, the fiber bed mist eliminator system comprising:
 a) a collector vessel having at least one inlet for allowing an aerosol laden gas stream to enter the collector vessel;
 b) at least two filter housings, each housing having an inlet and a gas outlet, wherein each filter housing is removably secured to the collector vessel;
 c) a fiber bed mist eliminator contained within each filter housing, each mist elimininator having an inner surface defining a first closed space in communication with the gas outlet and an outer surface defining with the filter housing a second space in communication with the gas inlet; and
 d) at least one outlet in each housing for exit of liquids removed from the aerosol-laden air by the fiber bed mist eliminator in the housing.

3. A fiber bed mist eliminator system as defined in claim 1 further comprising a valve provided between at least one filter housing and the collector vessel to selectably prevent the aerosol-laden gas from exiting the collector vessel.

4. A fiber bed mist eliminator system as defined in claim 2 further comprising a valve provided between at least one filter housing and the collector vessel to selectably prevent the aerosol-laden gas from exiting the collector vessel.

5. A fiber bed mist eliminator system as defined in claim 4, wherein the system has three upstanding filter housings.

6. A fiber bed mist eliminator system as defined in claim 1, wherein the fiber bed comprises randomly-distributed fibers sandwiched between an outer cage and an inner cage.

7. A fiber bed mist eliminator system as defined in claim 6, wherein said fibers have a mean diameter in the range from about 2 microns to about 50 microns.

8. A fiber bed mist eliminator system as defined in claim 6, wherein said fibers comprise materials selected from the group consisting of polymeric compounds, glass fibers, ceramics fibers, and mixtures thereof.

9. A fiber bed mist eliminator system as defined in claim 6, wherein said fibers are comprised of at least one polymeric compound selected from the group consisting of polyesters, polyvinyl chloride, polyethylene, fluorocarbons, nylons and polypropylene.

10. A fiber bed mist eliminator system as defined in claim 6, wherein said inner and outer support cages comprise materials which are substantially inert to the gas stream and the aerosol entrained therein which passes therethrough.

11. A fiber bed mist eliminator system as defined in claim 1, further comprising a liquid conduit system for removing liquid removed from the aerosol-laden air passing through the system, said liquid conduit system comprising at least one liquid drain in communication with each filter housing and a common conduit in communication with said at least one liquid drain, said common conduit having at least one outlet for discharge of liquid removed from the aerosol-laden air.

12. A fiber bed mist eliminator system useful for the removal of aerosols of less than 3 microns from a moving gas stream, the fiber bed mist eliminator system comprising:
 a) at least two filter housings, each housing having a gas inlet and a gas outlet;
 b) a fiber bed mist eliminator contained within each filter housing, each mist eliminator having an inner surface defining a first closed space in communication with the gas inlet and an outer surface defining with the filter housing a second space in communication with the gas outlet; and
 c) a collector vessel having at least two inlets for allowing a gas stream to enter the collector vessel from the filter housings; and
 d) at least one outlet in each housing for exit of liquids removed from the aerosol-laden air by the fiber bed mist eliminator in the housing.

13. A fiber bed mist eliminator system as defined in claim 2, further comprising a liquid conduit system for removing liquid removed from the aerosol-laden air passing through the system, said liquid conduit system comprising at least one liquid drain in communication with each filter housing and a common conduit in communication with said at least one liquid drain, said common conduit having at least one outlet for discharge of liquid removed from the aerosol-laden air.

14. A fiber bed mist eliminator system as defined in claim 3, further comprising a liquid conduit system for removing liquid removed from the aerosol-laden air passing through the system, said liquid conduit system comprising at least one liquid drain in communication with each filter housing and a common conduit in communication with said at least one liquid drain, said common conduit having at least one outlet for discharge of liquid removed from the aerosol-laden air.

15. A fiber bed mist eliminator system useful for the removal of aerosols from a moving gas stream, the fiber bed mist eliminator system comprising:

a) a collector vessel having at least one inlet for allowing an aerosol laden gas stream to enter the collector vessel;

b) at least two filter housings, each housing having at least one gas inlet in communication with the collector vessel, wherein each filter housing is removably secured to the collector vessel;

c) a fiber bed mist eliminator contained within each filter housing, each mist eliminator having an inner surface defining a first closed space in communication with the gas inlet and an outer surface; and d) at least one outlet in each housing for exit of liquids removed from the aerosol-laden air by the fiber bed mist eliminator in the housing.

* * * * *